(12) United States Patent
Sharper

(10) Patent No.: US 6,292,491 B1
(45) Date of Patent: Sep. 18, 2001

(54) DISTRIBUTED FIFO QUEUING FOR ATM SYSTEMS

(75) Inventor: Craig Alan Sharper, Los Altos, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/139,503

(22) Filed: Aug. 25, 1998

(51) Int. Cl.[7] .......................... H04L 12/28; G01R 31/08
(52) U.S. Cl. ........................ 370/412; 370/229; 370/230
(58) Field of Search .................................. 370/229, 230, 370/235, 236, 378, 412, 413, 428

(56) References Cited

U.S. PATENT DOCUMENTS

| | | | |
|---|---|---|---|
| 5,088,032 | 2/1992 | Bosack | 395/200 |
| 5,729,546 | 3/1998 | Gupta et al. | 370/434 |
| 5,742,604 | 4/1998 | Edsall et al. | 370/401 |
| 5,751,710 | 5/1998 | Crowther et al. | 370/423 |
| 5,765,032 | 6/1998 | Valizadeh | 395/200.65 |
| 6,108,307 | * 8/2000 | McConnell et al. | 370/235 |

OTHER PUBLICATIONS

"ATM Technology." In *LightStream 2020 System Overview*, Cisco Systems, Inc., pp. 1–1 through 1–14 (1997) (http://ww.cisco.com/univercd/cc/td/doc/p . . . t/atm/12020/2020r211/sysover/aboutsys.htm).

"Asynchronous Transfer Mode." In *LightStream 2020 System Overview*, Cisco Systems, Inc., pp. 15–1 through 15–14 (1997) (http://www.cisco.com/univercd/cc/td/doc/p . . . t/atm/12020/2020r211/sysover/aboutsys.htm).

Alles, A., "ATM Internetworking." An abridged version of this paper presented at Engineering InterOp, Los Vegas, NV (Mar., 1995).

* cited by examiner

*Primary Examiner*—Wellington Chin
*Assistant Examiner*—Brenda H. Pham
(74) *Attorney, Agent, or Firm*—Hamilton, Brook, Smith & Reynolds, P.C.

(57) ABSTRACT

A technique for distributed queuing in communication systems such as Asynchronous Transfer Mode (ATM) type access nodes which multiplexes data from multiple user nodes for transmission onto a trunk into the core of the network. A contention resolution mechanism for controlling user node access to the trunk is employed which uses the age of a queued cell as a contention resolution mechanism. The age information may be combined with other information such as priority or index number to further resolve access contention. The system permits implementation of first-in and first-out cell queue buffers that can efficiently support various traffic types such as voice, transaction processing, or aggregated traffic streams in which the order in which cells are processed should be maintained. The system is equally adaptable to situations in which each cell should have equal priority, rather than having priority assigned to particular ports. The system provides a low cost, fault tolerant, highly scalable mechanism for distributing the queuing intelligence of multiple line units, with no need for a central entity to make a decision as to access control.

20 Claims, 7 Drawing Sheets

DISTRIBUTED FIFO QUEUING FOR ATM SYSTEMS

FIELD OF THE INVENTION

The present invention relates to digital communication systems and in particular to an access node that makes use of distributed queuing such as may be deployed in an Asynchronous Transfer Mode (ATM) network system.

BACKGROUND OF THE INVENTION

Packet switching communication networks such as those based upon Asynchronous Transfer Mode (ATM) technology are increasingly used to transfer digital information over long distances. A typical ATM network can be viewed as including several different types of elements that permit an end node or user node such as a personal computer (PC) to be connected to other digital terminal equipment (DTE) such as host computer or service provider node. ATM networks transfer data in fixed length packets or "cells" on a demand driven basis using virtual paths and virtual channels defined within a physical transmission medium.

With the recent explosive growth in Internet-related data traffic, network service providers (NSPs) have had to find new ways to quickly upgrade their own network facilities to alleviate congestion and bottlenecks. The NSPs have therefore begun to deploy ATM technology in the core or background of their networks as an efficient and flexible means of carrying large amounts of data traffic. ATM is also being deployed towards the edge or access side of the network where it may provide connections to access multiplexers or so-called access nodes that allow residential users to connect to Internet Service Providers (ISPs) through an ATM network.

The elements within an ATM network include devices known as an access node and a switching node. The access node, more formally called a service access multiplexer, allows the combination of a variety of lower speed service connections into a single higher speed connection. The switch nodes may thus use higher speed communication links to move cell traffic to its intended destination. For example, an access node may aggregate traffic on multiple low speed links such as T1 or xDSL type digital communication links, and provide a connection to a switching node via high speed trunk lines such as T3 or OC3 communication links.

In general, it is desired that the trunk lines connected between the access nodes and the switching network only require a traffic capacity which is sufficiently large enough to handle the average expected load but not necessarily a peak expected load. The access nodes therefore preferably also perform some type of statistical multiplexing function. The statistical multiplexing function can, for example, operate on the cells on a first-in and first-out basis. In other words, the next cell to be sent over the trunk line can be selected to be the cell which entered the access node first.

Any mechanism used for selecting the cell priority needs to be fair and nonblocking in order for most applications, such as transaction processing, voice over cell and/or cell aggregation schemes for multiple users, to operate properly. In practice, first-in first-out queuing alone has been unable to provide the characteristics expected of an ATM network. It is, therefore, also often desirable in such networks for some sort of priority access to be granted to certain cells.

One priority scheme has been to try to equalize the bandwidth allocated per user node. Another approach is to prioritize access to the trunk based upon traffic loading. In this scenario, priority is granted on a dynamic basis to the nodes which have the higher amount of traffic.

Implementing any sort of priority scheme in this situation is complicated by the fact that ATM itself is a type of multiplex scheme. In particular, ATM was originally conceived as a flexible and responsive method for supporting multiple forms of digital traffic, including data, voice, image, and video, while providing rapid adaptability to changes in patterns of network traffic. The users of ATM networks generally expect that a mixture of bursty and delay sensitive traffic can be processed simultaneously.

ATM contrasts with more traditional multiplexing methods in the way in which it allocates communication channels. In traditional time division multiplexing, for example, communication channel access is divided into fixed periods of time called "frames." Frames are then divided into a fixed number of time slots of equal duration. Each user is then assigned a certain time slot within each frame. The time slots are generally implemented in a manner which is synchronous. A user node can therefore access a communication channel only during the time slot that has been allocated to them. If no traffic is ready to send when the designated time slot occurs, then the time slot is unused.

In contrast to this, in an ATM network, access to the communication channel is more flexible. Any user needing to communicate can use the channel whenever it is available. Therefore, ATM imposes no regular pattern on the way users are given access to a communication channel. In order to avoid a situation where any given user would monopolize the channel, every message is divided into small, fixed length cells. Arrangements are then made in the switching fabric such that no single user can monopolize access to the communication channel while other users have messages to send.

Any arbitration scheme for an access node to be used together with an ATM network therefore should exhibit priority allocation properties that are consistent with the overall ATM architectural philosophy. Otherwise, the access node itself may restrict the benefits obtainable by using ATM in the first place.

It is also useful to have a system that can be used to distribute the cell bus control mechanism over multiple cell queues with no central entity making the decision as to which cell is to be transmitted. This would have many advantages, including lower cost, better fault tolerance, improved scalability, and ease of hardware implementation.

SUMMARY OF THE INVENTION

The present invention is a technique for implementing a distributed queuing scheme and in particular a technique for determining priority of transmission among a number of cell queues within a traffic concentrator such as in an Asynchronous Transfer Mode (ATM) access node. In accordance with the invention, the access node permits the oldest queued cell to be asserted on the cell bus in any given time, taking also into consideration priority information as needed.

In order to accomplish this, the technique makes use of a binary count down contention bus that operates on a cyclic basis, with one bus period being allocated for each ATM cell. During each period, any queue having cells to be transmitted asserts the age of its oldest cell on the contention bus. The highest priority queue having the oldest cell is then permitted to assert its cell data on the next period on a separate traffic bus.

In the preferred embodiment, rather than calculating an age for each cell which would need to be reactivated on each bus cycle, a counter is included with each group of queues or line unit. The contents of the counter are saved with each cell in the queue. Therefore, when a cell is made available at the output end of a queue, the age of the cell can be determined by figuring the difference between the present counter value and the copy of the counter that was saved with the cell. There is, therefore, no need for various counters associated with various queues to be synchronized.

The contention bus is preferably a wire- or type inverted logic bus. The queues first assert the priority of their highest priority cell, sending the most significant bit first. The priority is binary encoded and inverted so that higher priorities will cause zeros on the bus and therefore win the contention because of the wire- or attachment. Once a queue sees a bit on the contention bus that is different from the bit that it is trying to assert, then that unit knows that a higher priority queue is contending. In this case, the lower priority queue removes itself from contention and does not try to contend for access again until the next period.

Next, each queue that is still contending, that is, each queue that has a cell to send at the priority that was determined during the initial contention stage, then sends the age of its oldest cell. The age is sent with the most significant bit first and in an inverted logic sense. Therefore, the oldest cell will win the contention in the same manner as for the priority information. Any queue that sees a mismatch on the bus from what it is sending removes itself for the remainder of the contention period, as that queue does not have the oldest cell at the highest priority level.

Finally, each queue that is still contending, that is, for each queue that has a cell at both the highest priority and is the oldest cell at that priority, is permitted to assert other contention information. Such other information may include a slot or index number, for example. The lowest numbered slot will be permitted to win the contention, and assert its cell on the bus. In this preferred embodiment, the slot number is used only as a tie-breaker when both the age and priority of the cells to be sent are identical. Since this is not envisioned to be very likely, any potential unfairness of the last numbered slot winning the contention has little affect over all. For example, once the lower numbered queue has sent its cell, it will no longer have the oldest cell at the highest priority level, and therefore other queues will win the next contention round.

The present invention provides multiple advantages.

The technique avoids the need for processing above the cell level.

Other resulting advantages include lower cost, better fault tolerance, improved scalability, and simple implementation in hardware.

While the overall system operates on a first-in first-out basis, it also supports environments wherein it is desirable to preserve the order of requests, such as in voice or transaction processing systems.

The technique can also be used to minimize delay through the multiplexing system such as is desirable in voice-over-cell systems, or in systems which aggregate streams from unrelated users where it is desirable to treat each cell with equal priority as opposed to each subscriber line or port.

The technique scales well; that is, additional line units and queues can be added without affecting the overall scheme and without the need of altering a centralized intelligence or controller.

The lack of central control for arbitrating access to the cell bus further makes expansion of the technique to different access node sizes easy.

The age contention mechanism may be as fine-grained as necessary and typically depends upon the expected sizes of the queues. For example, the queues can be as long as necessary in order to accommodate expected desired peak data rates.

The contention resolution scheme is compatible with and does not alter the characteristics of an Asynchronous Transfer Mode (ATM) type communication system. It operates well with various types of priority schemes enabling multiple queues to be assigned different priorities. This in turn supports the principal benefits of ATM technology, including allowing any user access to the network whenever resources are available, accommodating a wide range of traffic rates, permitting the use of cell sizes that are a compromise between the long frames of data applications and short repetitive frames of voice applications, and supporting degrees of bursting as compatible with both data and voice applications.

DETAILED DESCRIPTION OF A PREFERRED EMBODIMENT

Figure 1:
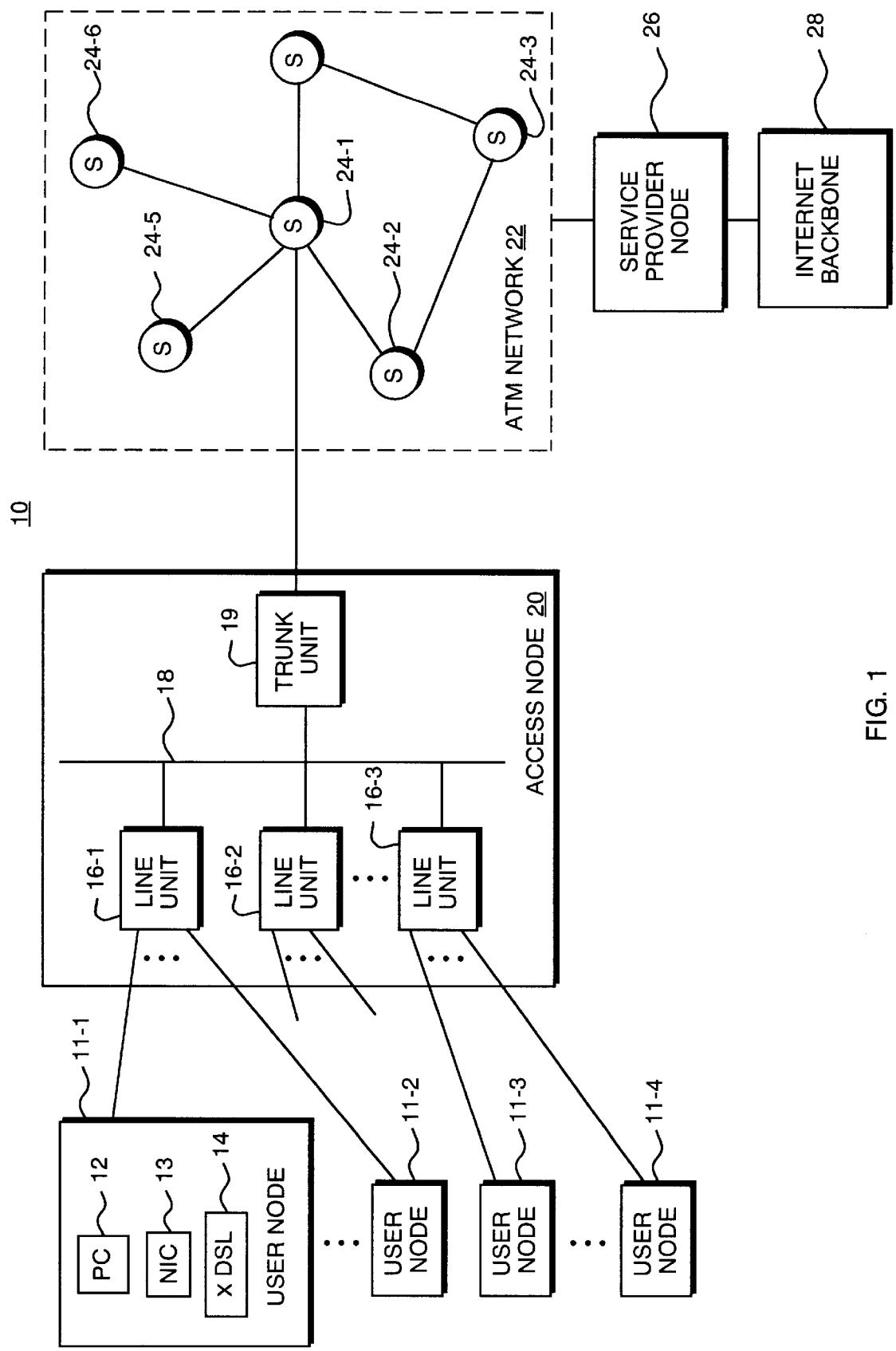
FIG. 1 is a block diagram of a communication network in which a distributed queuing scheme may be used according to the invention.

Turning attention now to the drawings more particularly, FIG. 1 is a block diagram of a communication system 10 which makes use of a distributed queuing scheme according to the invention. The communication system 10 may, for example, be used by an Internet Service Provider (ISP) to provide Internet access to a number of different users. In this arrangement, a number of user nodes 11-1, 11-2, 11-3, 11-4 (collectively, "the user nodes 11") each contain equipment such as personal computers 12. The personal computers 12 include suitable network communications equipment such as a network interface card (NIC) or other data converter equipment to enable the user node 11 to communicate data over the network 10. In the illustrated example, the user node 11 makes use of a digital subscriber line (xDSL) type communication interface.

The point of connection into the network 10 for the user nodes 11 is via an access node 20. The access node 20 (which also may be called a concentrator, communication controller, multiplexer, service access interface shelf, gateway, or other device), aggregates or multiplexes traffic from a variety of the lower speed user nodes 11 onto a higher speed trunk line for connection into a network 22. The network may be an Asynchronous Transfer Mode (ATM) network 22. The communication links deployed between the user nodes 11 and the access node 20 may typically be xDSL type links, whereas the links between the access node 20 and the ATM network 22 may be higher speed links such as T3 or OC3 type links providing a much higher data rate of up to 155 megabytes per second.

Within the access node 20, a number of line units 16-1 each transmit and receive data to and from multiple user nodes 11. For example, the line unit 16-1 is connected to receive data traffic from the user nodes 11-1 through 11-2. Multiple line units 16-1, 16-2, 16-3 are coupled over a cell bus 18 to a trunk unit 19. The cell bus 18 provides for concentration of the cells for transfer over the higher speed trunk communication link into the ATM network 22. The line units 16 are also typically responsible for converting between the protocol used by the user nodes 11 such as the aforementioned DSL and the protocol used on the ATM network such as the asynchronous transfer mode protocol. The line units 16 are called "units" here, and although it should be understood that such devices are embodied as a single printed circuit board or "line card," it should be understood that they may be a much higher level of circuit integration. Furthermore, as will be understood shortly, each line unit typically contains multiple cell queues which actually couple to the cell bus 18.

As illustrated, the ATM network 22 consists of a number of switching nodes 24-1, 24-2, ..., 24-6. Each switch 24 is preferably a specialized computer that provides a facility for transferring data between source and destination nodes within the ATM network 22, in a manner which is well known. In the present illustration, one of the switches 24-3 provides access to the network 22 for a service provider node 26. The service provider node 26, such as operated by an ISP, provides a connection to an Internet backbone 28. In this manner, by connecting through a series of virtual channel links and virtual paths through the ATM network 22, via a connection over the cell bus 18, any given user node 11 may communicate with other nodes connected to the Internet backbone 28.

Although the present discussion of the network 10 assumes xDSL, an ATM-type network, and Internet backbone access, it should be understood that the teachings herein may be applied to other types of communication networks 10 that make use of multiplexing devices to aggregate digital data traffic. For example, the user nodes 11 may communicate with the line units 16 using any other type of suitable digital communication protocol such as T1, Ethernet, ISDN, or other suitable protocols for communicating with digital terminal equipment.

Figure 2:
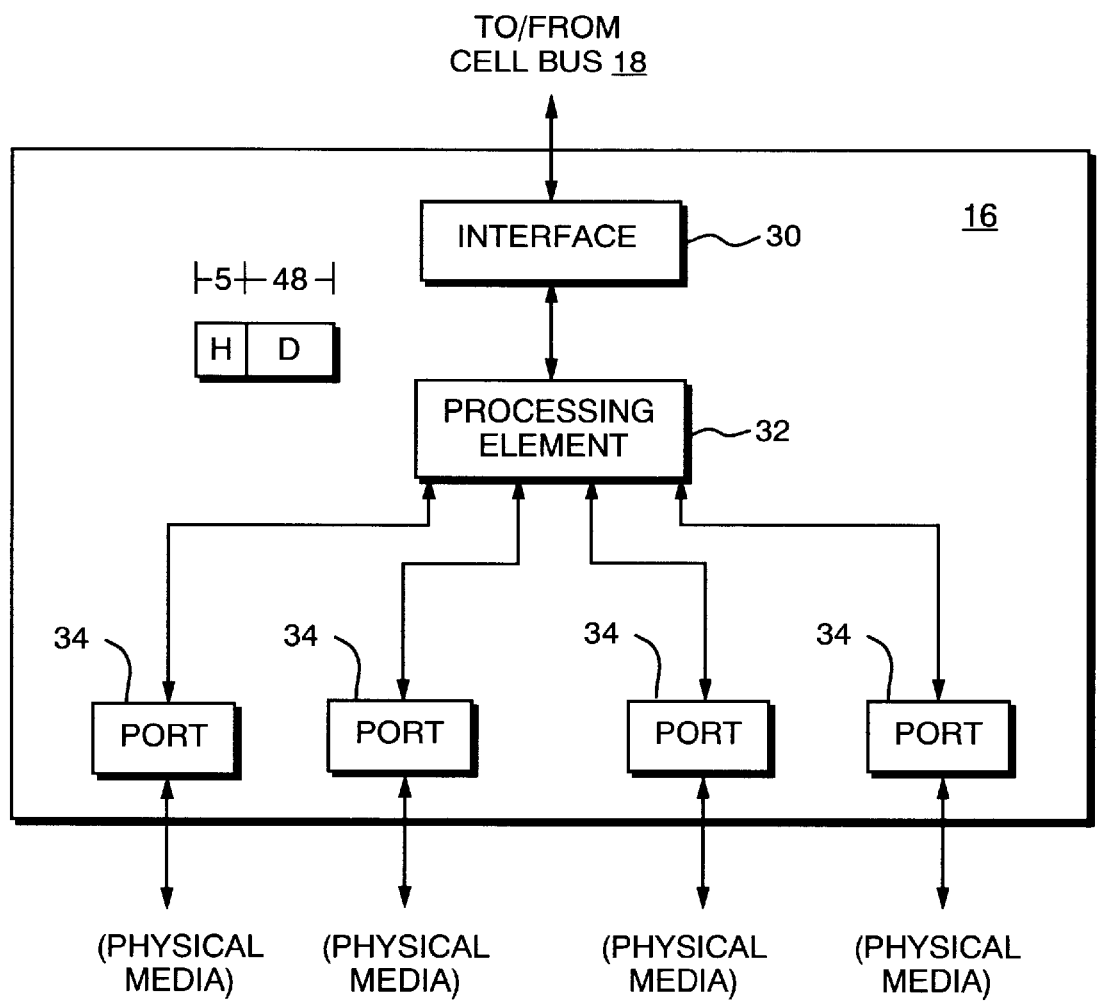
FIG. 2 is a more detailed block diagram of a line unit.

FIG. 2 is a high level block diagram of one of the line units 16. The line unit 16 consists in general of an interface portion 30 that provides a connection to the cell bus 18, a processing element 32, and various port interfaces 34. The port interfaces 34 transmit and receive data from the user nodes 11 over the associated xDSL physical media. There may be a number of ports, such as sixteen ports, on a given line unit 16. The processing element 32 receives data from the ports and passes it through the interface to the cell bus. In the case of the ATM network being described herein, the processing element 32 formats all traffic received on the ports 34 into fixed length packets of information called cells. The processing element 32 and interface 30 then control access to the cell bus 18 in an asynchronous fashion. Indeed, it is the manner in which access is provided to the cell bus 18 from the cells being provided by the various ports 34 which is the subject of the present invention.

Figure 3:
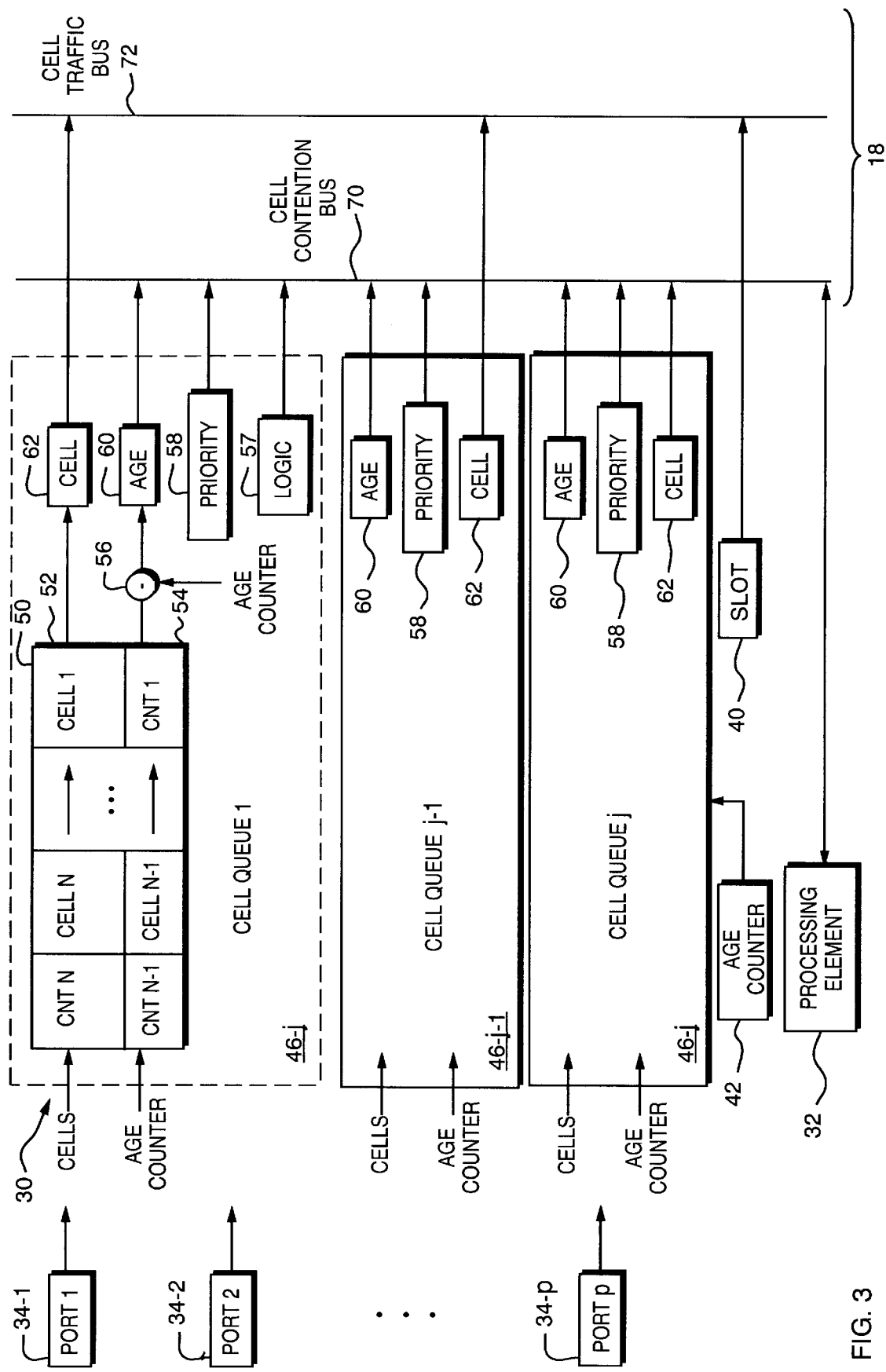
FIG. 3 is a detailed circuit diagram of the line unit showing multiple cell queues, a contention bus, a traffic bus, and processor.

FIG. 3 is a more detailed circuit diagram of the processing element 32 and interface 30. Within the parlance of the ATM hierarchy, the processing element and interface operate at the data link layer (layer 2) including the ATM adaption layer and the ATM cell layer. In addition, although it forms no part of the present invention, it should be understood that the processing element 32 and interface 30 also place labels within the header of each 53-byte long cell that provides information used in transporting the cell across the various hops within the ATM network 22. These labels include various virtual path identifiers and/or virtual circuit identifiers to enable each cell to arrive at its intended destination in the network 22.

Turning attention to FIG. 3 more particularly, the interface 30 within each line unit 16 includes a number of cell queues 46-1, ..., 46-j-1, 46-j, an age counter 42, a slot register 40, and other elements. Each cell queue 46 in turn includes a first-in first-out memory (FIFO) 50, the FIFO 50 having a cell storage portion 52 and counter storage portion 54, a difference circuit 56, a contention bus logic circuit 57, a priority register 58, a current cell age register 60, and a current cell data register 62.

In operation, the ports 34 receive data from the user nodes 11 and format it as a series of ATM cells in a manner which is well known. The cell data in turn provided at each of the ports 34 is sent to one of the cell queues 46. There may be a one-to-one correspondence between the ports 34 and the cell queues 46; however, such a limitation is not a requirement. For example, multiple queues 46 may typically service a given port 34, or there may be multiple ports 34 associated with particular queue 46 depending upon the system architecture. It should therefore be understood that the number of ports, p, is not necessarily equal to the number of cell queues, j.

As cells are received from a respective port 34, they are placed within the cell storage portion 52 of the FIFO 50. The FIFO 50 then processes the cells in a manner which is well known in the art. That is, the first cell placed into the cell storage FIFO 52 on a write cycle is the first cell read out of the cell storage FIFO 52 on a read cycle.

In addition to storing the fifty three bytes of data and header information, each cell stored in the FIFO 50 also has stored with it a corresponding age counter value in an age counter portion 54 of the FIFO 50. Each cell that is stored within the FIFO 50 therefore has as associated age value which is equal to contents of the age counter 42 at the time that the particular cell was stored in the cell queue 46. The age counter value is read from the age counter 42 associated with the particular line unit 16; age counter 42 typically serves each of the cell queues 46 on the given line unit 16. The age counter 42 is simply a free running counter clocked at the rate of the cell traffic bus 18 and/or a multiple of the rate of the cell traffic bus 18. Its contents need not be synchronized with the age counters 42 associated with other line units 16.

The remaining parts of the cell queue 46 are concerned with determining when it is appropriate for the queued cells within its respective cell storage portion 52 to be asserted onto the cell bus 18. As can be seen from the drawing, the cell bus 18 more particularly consists of a cell traffic bus 72 over which the cell data actually travels, as well as a cell contention bus 70, which is used to control access to the cell traffic bus 72.

The cell contention bus 70 is used to transfer information among the cells queues 46 in order to determine, for each time slot on the cell traffic bus 70, which cell will be asserted by which cell queue 46. In particular, as each cell is read out of its cell storage FIFO 52, the associated stored counter value 54 is also read. However, rather than assert the counter value 54 directly onto the cell contention bus 70, the counter value 54 is first subtracted from the present value of the age counter 42 by the subtractor 56. This provides a measure of the relative age of the cell, relative to all the other cells stored on the line unit 16. Indeed, the age is relative to all other cells stored in the access node 20. In this manner, by storing a copy of the age counter 42 when enqueuing each cell, when it becomes time to contend to send the cell, the cell age can be determined by taking the difference between the present value of the age counter and the value of the age counter saved with the cell. Cell age can therefore be used as a contention resolution measure on the cell contention bus.

For example, any given cell queue 46 that has a cell which has the same priority as a cell from another cell queue 46 can be given priority to transmit over the traffic bus if it is the oldest cell. Cell age may also be combined with other parameters such as priority and/or other information such as a line unit slot or queue index number in order to further resolve conflicts.

The priority information associated with each queue may be assigned in any suitable way. Priority may be assigned by traffic type, by service contract level, or in a round robin fashion, for example. Priority may also be changed on the fly such as by commands from the processing element 32. What matters for the present invention is that traffic is directed to one of the queues 46 by some sort of priority, such that the cells of a given priority are stored in a given queue 46. For example, a line unit 16 may have only a single queue 46 if its data will always be of a given priority level, or multiple queues of the same priority may be assigned to handle traffic loads.

Figure 4:
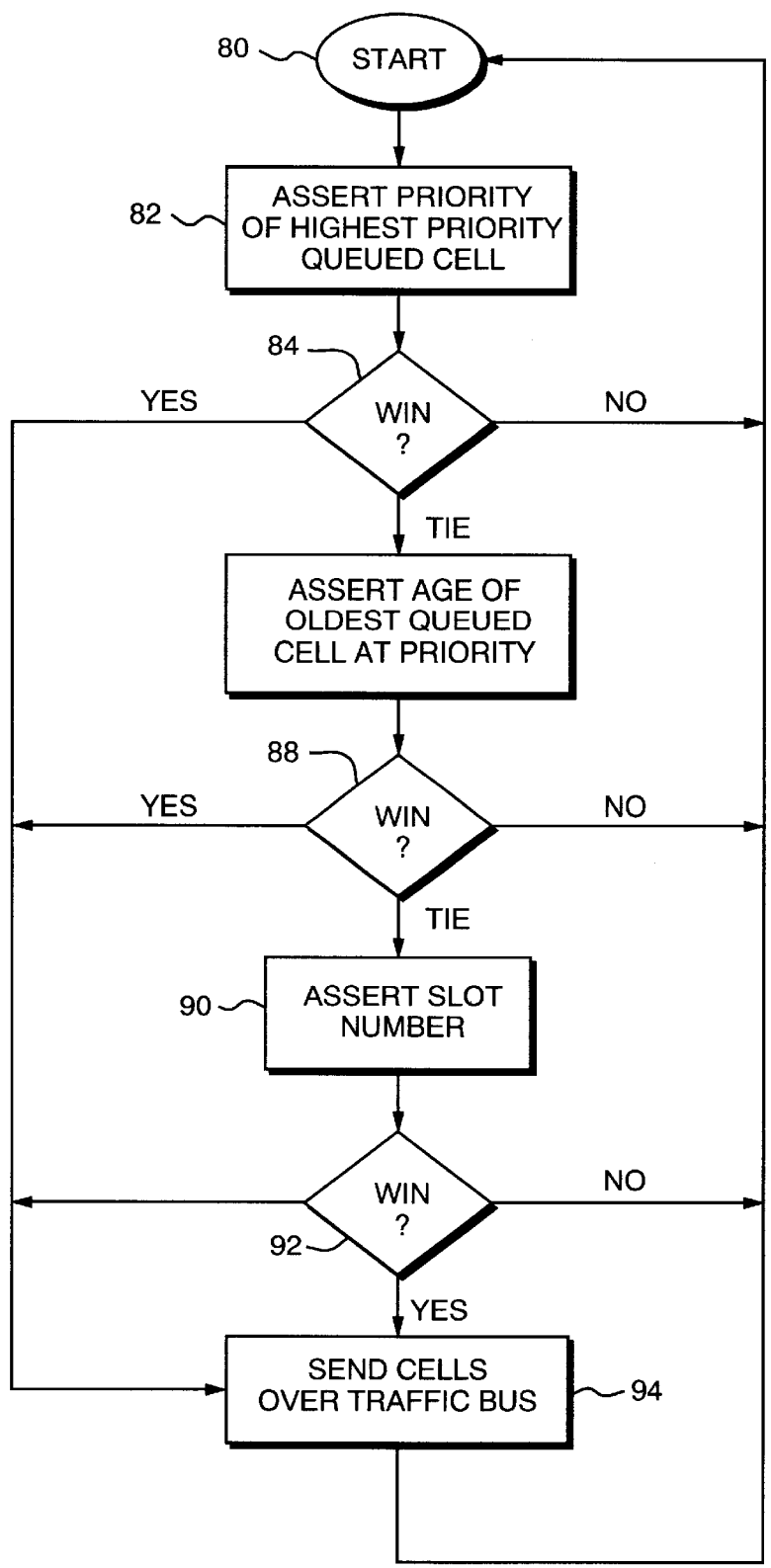
FIG. 4 is a flow chart of the operations performed by the processor of FIG. 3.

Describing the preferred embodiment more particularly now, the contention logic 57 makes use of the age information stored in the age register 60, and the priority information in priority register 58, to determine which cell 62 is permitted to be asserted onto the cell traffic bus 72. FIG. 4 is a detailed state diagram of the process that the logic 57 may use. For example, from an initial start state 80, the logic 57 may proceed to a state 82 in which the priority value is asserted onto the contention bus 70. If in state 84 the particular cell queue 46 determines that it has won the priority contention, then the logic 57 proceeds to state 94. However, if in state 84 it determines that it does not have the highest priority queued cell, then the logic 57 returns to the starting state 80.

If there is a tie, that is, if there is more than one queued cell having the same priority, then state 86 is entered in which the age of the oldest queued cell at the indicated priority will be determined. In state 86, the age of this queued cell is asserted on the contention bus 70. If it turns out that the particular cell queue 46 does not have the oldest queued cell at the indicated priority, then it returns to the start state 80. If, however, it does have the oldest queued cell, or the only queued cell at that priority, then processing proceeds to state 94.

The cell counter subtraction may be implemented with appropriate carry bit(s) such that when the value of the age counter "rolls over" from the all ones state to the all zeros state, a true age value is still maintained.

The number of bits in the age counter can be, for example, 24 or 32 bits, depending upon how deep the FIFO memories 50 are and how long data can be permitted to wait in the FIFO 50. For a 155 megabits per second OS3 output data rate, there may be as many as 400,000 ATM cells per second being processed by the access node 20. In this instance, a 24 bit counter holds enough information to accurately age up to 10 seconds worth of data.

In state 90, a line card slot number is then asserted on the contention bus 72. The slot number is associated with the line unit 16 and permits the further resolution of access between various line units 16 having queued cells of the same priority and age. If the present line card 16 does not have the lowest numbered slot, then it returns to start state 80. If it does have the lowest numbered slot, processing proceeds to state 94. In an instance where multiple queues on the same line card 16 may be active at the same time, a queue index number may instead be asserted.

In state 94, the associated cell is permitted to be transferred over the cell traffic bus 72.

The cell contention bus 70 uses a binary count down scheme in the preferred embodiment. In this implementation, the contention bus 70 operates on a cyclic basis with one complete contention bus period corresponding to the trunk transmission time frame of a single 53 byte ATM cell. This permits the contention bus 70 to determine during one period which cell queue will have access to the trunk during the next period.

Multiple queues place their contention bits on the contention bus 70 in a wire- or manner. That means that if any particular queue 46 wants to pull the bus low with its contention bits, then the bus goes low. If no queue 46 attempts to pull the bus low, a pull up resistor pulls the bus high. If a device connected to the bus wins the contention, the other cell queues enter a state in which they will no longer contend for priority during that cycle. The contention information is placed on the bus bit serial order, most significant bit first. The contention information is further binary encoded, but inverted such that higher priority contention information will cause zeros on the bus and therefore win the remainder of the contention period. That is, once a queue sees a bit on the bus that is different from what it is trying to send, that is, when a queue is trying to send a one and the bus is a zero, that queue knows that it has lost, and removes itself from contention until the next period.

Figure 5:
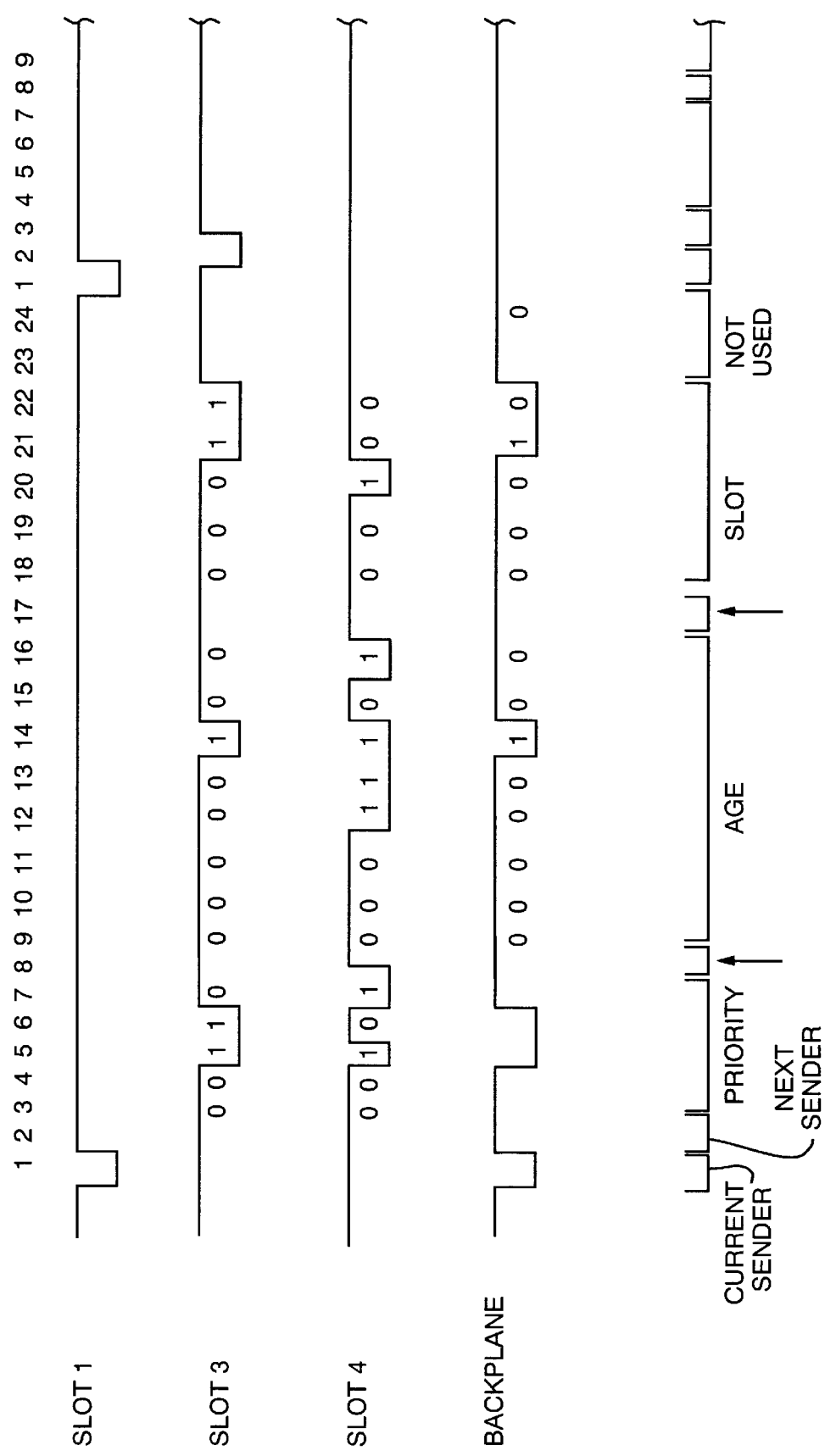
FIG. 5 is a timing diagram showing the signals on the contention bus when different priorities are asserted.

This scheme can be understood more particularly by referring to the timing diagram of FIG. 5. The figure shows a situation where cell queues 46 are contending with different priorities. In this example, it can be seen that the contention period consists of twenty four cycles on the contention bus 70. In a first cycle 1, the current sender, in this case, the queue having slot number 1, asserts a zero to indicate that it has control over the traffic bus during this period. In the next time slot 2, the system enters a state in which it will begin to identify the next sender for the next period. In the next sequence of time slots, such as time slots 3 through 7, the queues 46 assert their priority information bits on the contention bus 70. In this scenario, the queue 46 associated with slot 3 has data to send with a priority level of 6, whereas the slot 4 has data with a priority of 5. Therefore, through bus cycles 3 and 4, they each see the same contention information and each remain in contention. The same is true in cycle 5 since they both assert a logic one on the bus. However, in cycle 6, the queue in slot 4 realizes that it is asserting a zero whereas the one in slot 3 is asserting a one; the slot 4 queue therefore removes itself from the remainder of the contention.

Having won the contention, the slot 3 queue proceeds to assert its age information on the bus during cycles 9 through 16. The age information is also sent most significant bit first and inverted so that the oldest cell will win the contention. Slot information is asserted during cycles 18 through 22 in order to finally resolve contention with any of the other queues 46. Finally, at the end of the contention period in cycle 24, it is determined that the queue in slot 3 has won the contention and therefore it will assert its cell data during the next period on the traffic bus 72.

Figure 6:
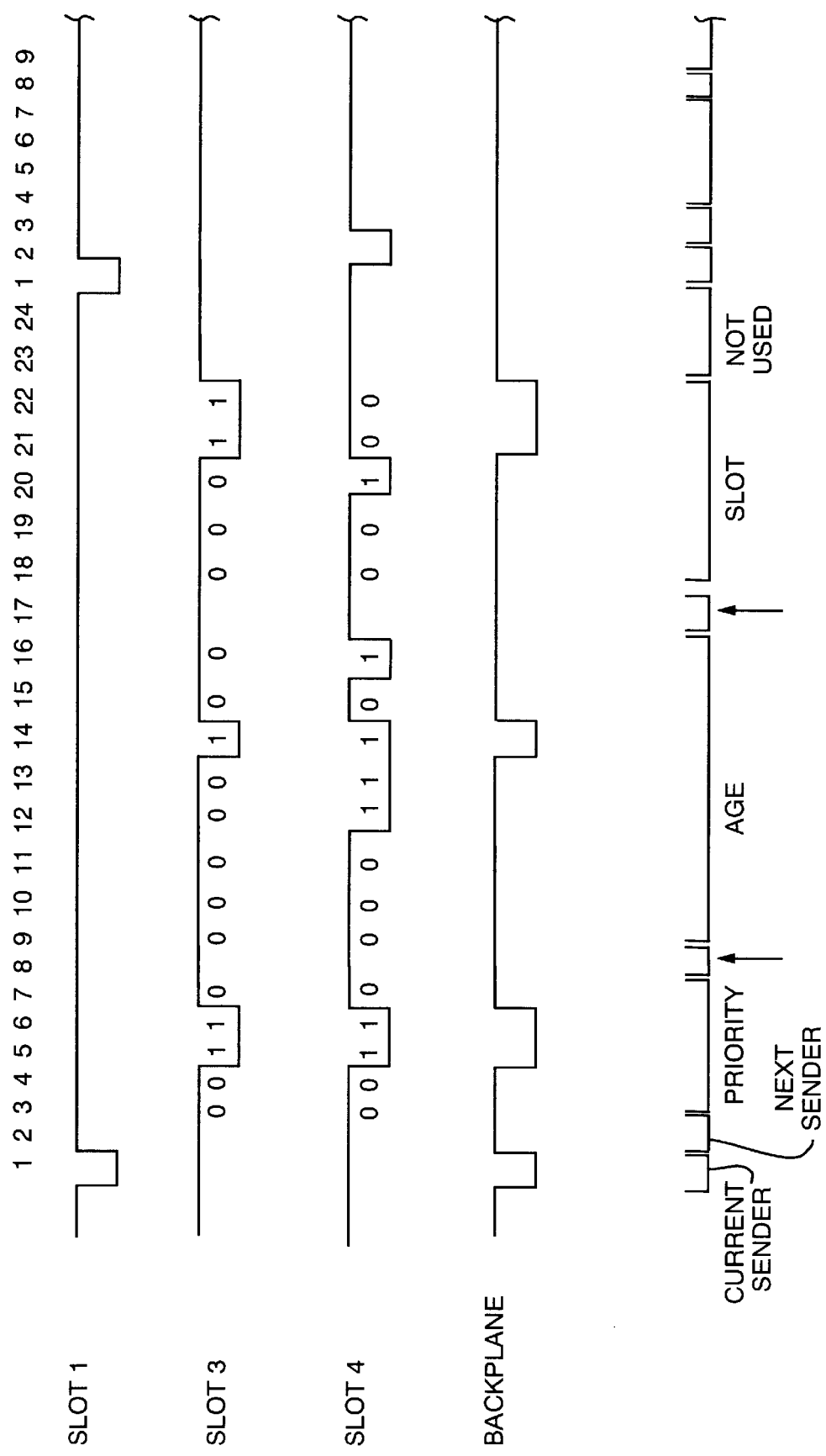
FIG. 6 is a timing diagram showing the signals on the contention bus when different cell ages are asserted.

FIG. 6 indicates the scenario on the contention bus 70 when both slot 3 and slot 4 have the same priority. In this instance, during cycles 3–7, they each assert the same priority information and therefore each of the line units remain in contention. They then proceed to assert their age values during the cycles 9 through 16. During cycles 9 through 11, they are each asserting a zero and therefore remain in contention. However, at cycle 12, slot 3 is asserting a zero while slot 4 is asserting a one on the bus 70. At this point, slot 3 will remove itself from further contention during this period. At the end of the contention period, slot 4 will be able to assert its data in the next period on the traffic bus 72.

Figure 7:
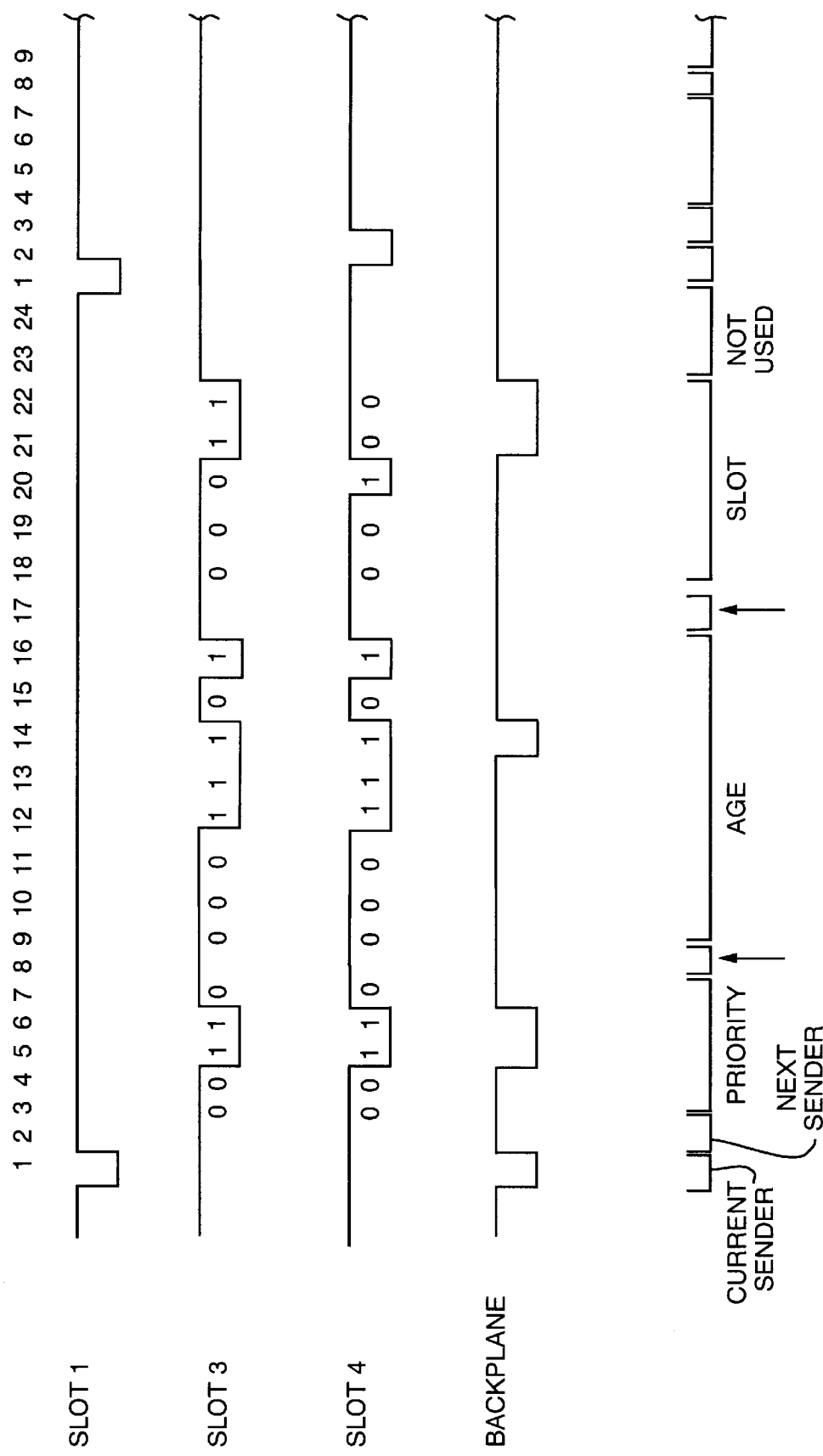
FIG. 7 is a timing diagram showing signals on the contention bus where the cells have the same priority and same age.

FIG. 7 illustrates the situation which occurs when the queues in slots 3 and 4 have both the same priority and an oldest cell of the same age. In this instance, they each remain in contention at the end of cycle number 16, having asserted both the same priority and age information. However, from cycles 18 through 22, the slot 4 queue asserts a one where slot 3 is asserting a zero. Because it has the higher slot index, the queue in slot 4 therefore wins the contention and is permitted to assert its cell data during the next sender time period on the traffic bus 72. Again, any queue that sees a mismatch on the contention bus 70 from what it is sending removes itself for the remainder of the contention period as it will not have the oldest cell.

The slot number is used only as a tie breaker in the situation where both the age and priority of the cells are identical. This is not envisioned to occur very often, so that any potential unfairness of letting the lowest numbered slot go first has little effect overall on the characteristics of the system 10. This effect can be minimized by increasing the resolution of the units of age of the cell making it less likely that there are multiple cells with the same age. The units of age are arbitrary, but one convenient measure is the bus period.

It can now be understood how the age of a cell can be used as the fundamental contention mechanism on a cell bus 72 to implement an access node providing ATM switching network access to a number of user nodes. The technique described herein eliminates the need for keeping track of the age of a large number of queued cells while at the same time eliminating the need to synchronizing line units amongst one another. This distributed intelligence for controlling access to the contention bus does not alter the fundamental ATM attributes of bandwidth efficiency, scalability, transparency, or ease of routing. In particular, any user node is permitted access to the ATM network whenever resources are available. User nodes with longer messages are prevented from blocking access and a wide variety of traffic rates can still be accommodated. Because the cell size is not modified, various degrees of "burstiness" can be accommodated such as for various applications from voice to data to video. Because no processing occurs above the cell level, the technique is simple and does not affect message handling speed.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method for use in an access node connecting a plurality of user nodes to a digital communication network using an asynchronous transfer mode, the method comprising the steps of:
   queuing data traffic received from the user nodes as a set of queued cells;
   storing within each queued cell an age value indicative of the age of the cell;
   connecting a cell bus to receive cells from a plurality of the queued cells, the cell bus providing access to the digital communication network; and
   resolving contention over access to the cell bus using the age value of a given cell to determine which cell will be granted access to the cell bus,
   wherein the step of resolving contention additionally comprises the steps of:
      incrementing the contents of a cell counter at a predetermined rate; and
      determining the age value of a cell by subtracting the present contents of the cell counter and the age value stored with each cell in order to determine the relative age of each cell.

2. A method as in claim 1 wherein the step of resolving contention additionally comprises the step of:
   assigning a priority to each queued cell, and using the cell age value as a contention resolution mechanism only when the assigned priority of two or more queued cells is the same.

3. A method as in claim 2 additionally comprising the step of:
   if two or more cells assert the same priority, using an index number associated with a queued cell as further contention resolution mechanism.

4. A method as in claim 1 wherein a cell counter is associated with each queued cell.

5. A method as in claim 4 wherein the cell counters associated with each queued cell are not synchronized with one another.

6. An access node for connecting a plurality of user nodes to a digital communication network using an asynchronous transfer mode comprising:
   a storage device connected to queue data traffic received from the user nodes as a set of queued cells to store within each queued cell an age value indicative of the age of the cell;
   a cell bus, connected to receive cells from a plurality of the queued cells, the cell bus providing access to the digital communication network; and
   a bus access controller, connected to resolve contention over access to the cell bus using the age value of a given cell to determine which cell will be granted access to the cell bus,
   wherein the bus access controller additionally comprises:
      a cell counter connected to increment at a predetermined rate; and
      a subtractor, for determining the age value of a cell by subtracting the present contents of the cell counter and the age value stored with each cell in order to determine the relative age of each cell.

7. An apparatus as in claim 6 wherein the access controller additionally comprises:
   a priority assignment mechanism, for assigning a priority to each queued cell, and for using the cell age value as a contention resolution mechanism only when the assigned priority of two or more queued cells is the same.

8. An apparatus as in claim 7 additionally comprising:

an index number storage register, for storing an index number associated with a queued cell as further contention resolution mechanism.

9. An apparatus as in claim 6 wherein a cell counter is associated with each queued cell.

10. An apparatus as in claim 9 wherein the cell counters associated with each queued cell are not synchronized with one another.

11. A computer program product for use in an access node connecting a plurality of user nodes to a digital communication network using an asynchronous transfer mode, the computer program product comprising a computer usable medium having computer readable code thereon which:

queues data traffic received from the user nodes as a set of queued cells;

stores within each queued cell an age value indicative of the age of the cell;

connects a cell bus to receive cells from a plurality of the queued cells, the cell bus providing access to the digital communication network; and resolves contention over access to the cell bus using the age value of a given cell to determine which cell will be granted access to the cell bus, including code which:

increments the contents of a cell counter at a predetermined rate; and determines the age value of a cell by subtracting the present contents of the cell counter and the age value stored with each cell in order to determine the relative age of each cell.

12. A computer program product as in claim 11 wherein the computer code additionally:

assigns a priority to each queued cell, and using the cell age value as a contention resolution mechanism only when the assigned priority of two or more queued cells is the same.

13. A computer program product as in claim 12 wherein the computer code additionally:

uses an index number associated with a queued cell, if two or more cells assert the same priority, as a further contention resolution mechanism.

14. A method as in claim 13 wherein a cell counter is associated with each queued cell.

15. A computer program product as in claim 14 wherein the cell counters associated with each queued cell are not synchronized with one another.

16. An access node for connecting a plurality of user nodes to a digital communication network using an asynchronous transfer mode, the access node comprising:

means for queuing data traffic received from the user nodes as a set of queued cells;

means for storing within each queued cell an age value indicative of the age of the cell;

means for connecting a cell bus to receive cells from a plurality of the queued cells, the cell bus providing access to the digital communication network; and means for resolving contention over access to the cell bus using the age value of a given cell to determine which cell will be granted access to the cell bus, wherein the means for resolving contention additionally comprises:

means for incrementing the contents of a cell counter at a predetermined rate; and means for determining the age value of a cell by subtracting the present contents of the cell counter and the age value stored with each cell in order to determine the relative age of each cell.

17. An apparatus as in claim 16 wherein the means for resolving contention additionally comprises:

means for assigning a priority to each queued cell, and using the cell age value as a contention resolution mechanism only when the assigned priority of two or more queued cells is the same.

18. An apparatus as in claim 17 additionally comprising:

means for using an index number associated with a queued cell, if two or more cells assert the same priority, as a further contention resolution mechanism.

19. An apparatus as in claim 16 wherein the cell counter is associated with each queued cell.

20. An apparatus as in claim 19 wherein the cell counter is associated with each queued cell are not synchronized with one another.

* * * * *

UNITED STATES PATENT AND TRADEMARK OFFICE
CERTIFICATE OF CORRECTION

PATENT NO. : 6,292,491 B1
DATED : September 18, 2001
INVENTOR(S) : Craig Alan Sharper It is certified that error appears in the above-identified patent and that said Letters Patent is hereby corrected as shown below:

<u>Column 11,</u>
Line 43, delete the dependency "claim 13" and insert -- claim 11 --.

Signed and Sealed this

Fourteenth Day of May, 2002

Attest:

JAMES E. ROGAN
*Attesting Officer*    *Director of the United States Patent and Trademark Office*